UNITED STATES PATENT OFFICE 2,783,259
Patented Feb. 26, 1957

2,783,259

METHOD OF EXTRACTING CARNAUBA-LIKE WAXES FROM CRUDE MONTAN WAXES

Willi Hessler, Wiesbaden, Germany

No Drawing. Application September 8, 1953,
Serial No. 379,092

Claims priority, application Germany September 16, 1952

3 Claims. (Cl. 260—423)

The invention relates to a method of extracting carnauba-like waxes from crude montan waxes, which makes it possible to produce waxes the properties of which are similar to or approach those of the high grade carnauba waxes at far less cost than that entailed in the production of the usual commercial carnauba wax itself.

It has already been proposed to oxidize and refine crude montan wax by treatment with air or other oxygen-containing gases in a similar way to that known for the oxidation of paraffin wax. In this process, which has occasionally also been applied to oxygen-containing waxes, an extensive chemical conversion of the substances treated takes place, which, for example, in the case of montan wax as the starting material results in the loss of the hard wax character of montan wax which is particularly valuable from the point of view of its industrial use. In point of fact there result from such a treatment products which are of grease-like character and in any case ceresine-like structure and which have properties that, from the technical standpoint and compared with those of the starting materials, have not been improved but, on the other hand, worsened. Apart from a certain structural similarity to beeswax these products have none of the other valuable properties of the latter, such as oil binding power, and ability to produce polish. For this reason, products prepared in such a way have not been used in practice to a noteworthy extent.

The method according to the invention on the contrary makes it possible to produce from crude montan wax substances which in their properties and possibilities of use are very similar to ordinary carnauba waxes. The method consists essentially in that a solution of montan wax in an oxygenated solvent as for example alcohol is subjected to several hours' treatment with air or other gas containing oxygen at an elevated temperature of between 70° and 100° C., the asphalt particles set free by this treatment are separated, and a refined product is crystallized out from the remaining solution at a low temperature in the form of a coffee-coloured hard wax, the resinous part of the montan wax remaining in solution.

The treatment at elevated temperature suitably lasts for a period of about 9 hours. It can be carried out under normal or, if necessary, superatmosphere pressure.

The properties of the final product of the new method will better correspond with those of the natural hard waxes such as carnauba, candelilla and fibre wax which have a considerable content of resin that is important for their technical use, if the method is so carried out that part of the resin content remains in the refined product.

For this reason the method is preferably so carried out that only so much of the clear resin solution is filtered off from the crystallized wax that, after evaporating the remaining solvent, the wax contains about 10% of resin. This percentage can, of course, be altered one way or the other according to the desired properties of the final product.

The following examples are given of the new method but it will be understood that the invention is not limited to those examples.

*Example 1*

60 gr. of crude montan wax are dissolved in 1000 ml. of boiling isobutanol. Air in finely divided form is introduced into the solution, stirring the while. Loss of solvent is prevented by a reflux cooler and absorption traps. After 9 hours' treatment in this way the precipitated asphalt-like deposit is separated off and the wax is then made to crystallize out from the solution at a temperature of about 0°. There thus results 35 gr. of a coffee-brown wax of melting point 84°, acid value 26.7, saponification value 73.4.

*Example 2*

60 gr. of crude montan wax are dissolved in 1000 ml. of boiling normal propanol and the solution is subjected to about 9 hours' treatment with air introduced in finely divided form, whereupon, after separating the precipitated asphalt-like particles, crystallizing out of the wax takes place at low temperatures as in Example 1.

Only 50–60% of the solution is filtered off and the crystallized out wax with the remainder of the solution is evaporated in vacuo to dryness. There results about 40.8 gr. of a dark brown wax of melting point 86°, acid value 24.8, saponification value 94.5.

In both examples the properties of the product obtained largely correspond with those of carnauba wax (melting point 83–84°, acid value 5–9, saponification value 79–82).

I claim:

1. A method of obtaining wax similar to carnauba wax from crude montan wax, which comprises treating a solution of the crude montain wax in an oxygenated solvent with an oxygen containing gas for several hours at a temperature between 70° and 100° C., separating the freed asphalt-like particles from the solution of wax and resin, cooling the solution to a low temperature to precipitate out a refined-wax, and separating the refined wax from the resin-containing mother liquor.

2. The method according to claim 1, wherein the precipitated refined wax is separated from a part only of the resin-containing mother liquor and the precipitated refined wax is dried together with the remaining mother liquor.

3. The method according to claim 1, wherein the precipitated refined wax is separated from a part only of the resin-containing mother liquor and the precipitated refined wax is dried together with the remaining mother liquor, the amount of mother liquor remaining with the precipitated refined wax being such that the dried product contains about 10% by weight resin.

References Cited in the file of this patent

UNITED STATES PATENTS

| | | |
|---|---|---|
| 1,092,629 | Adolf von Boyen | Apr. 7, 1914 |
| 1,834,866 | Pungs et al. | Dec. 1, 1931 |

OTHER REFERENCES

Lewkowitsch: Chemical Technology and Analysis of Oil, Fats and Wax, page 280, vol. III, 1915.